March 14, 1933.   L. W. JOHNSON   1,901,518
CLEANING DEVICE
Filed Dec. 9, 1929   2 Sheets-Sheet 1
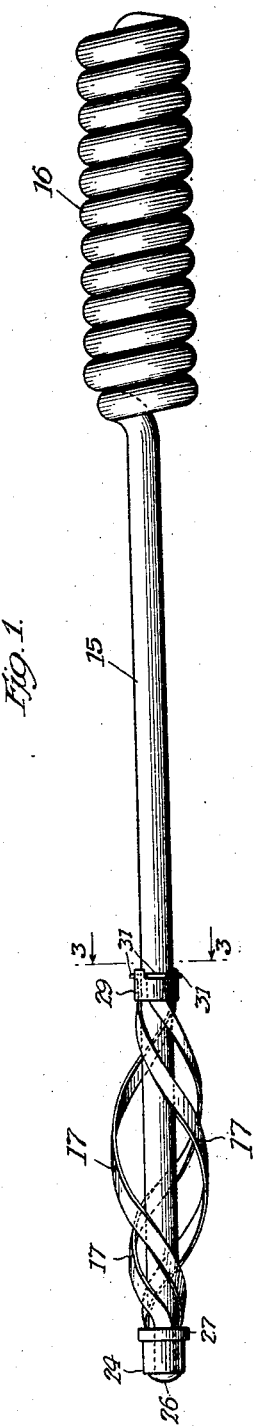
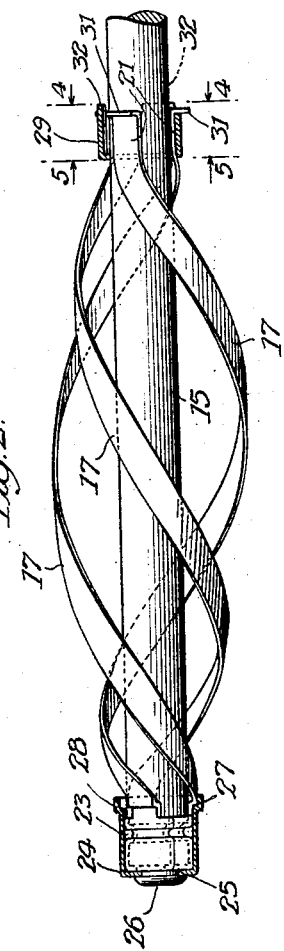
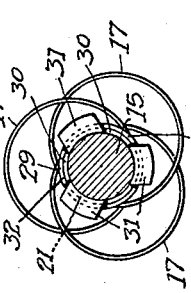
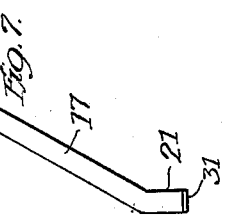
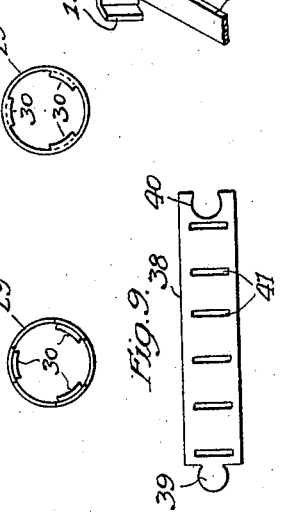
Inventor
Leonard W. Johnson March 14, 1933. L. W. JOHNSON 1,901,518
CLEANING DEVICE
Filed Dec. 9, 1929 2 Sheets-Sheet 2
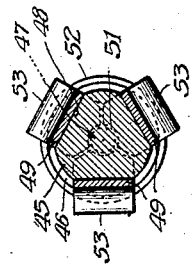
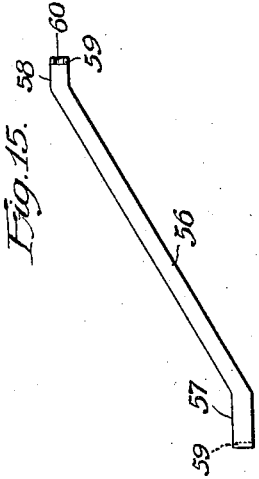
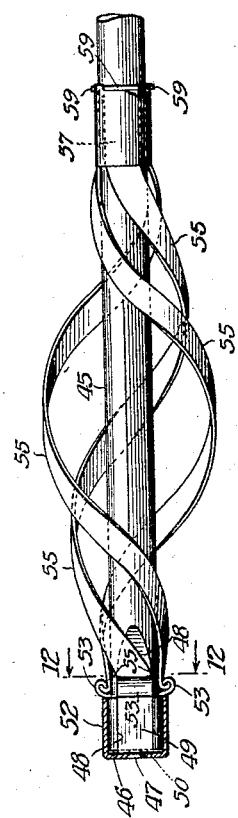
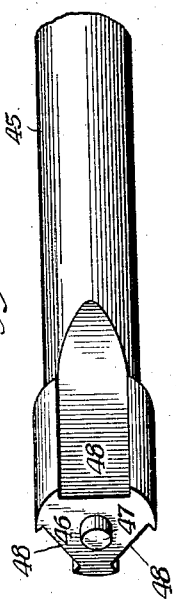
Inventor
Leonard W. Johnson Patented Mar. 14, 1933

1,901,518

UNITED STATES PATENT OFFICE

LEONARD W. JOHNSON, OF BATAVIA, ILLINOIS

CLEANING DEVICE

Application filed December 9, 1929. Serial No. 412,692.

My invention relates to cleaning devices and has particular reference to a device for use in cleaning carbon out of the openings through which the valve and tappet rods extend in internal combustion engines.

Another and further object of my invention is the provision of a cleaner which is effective in removing the carbon and other foreign matter from the side walls forming the opening, which is efficient, is easily and quickly used, and which does not increase the size of the openings through which the rods pass.

Another and further object of my invention is the provision of a cleaner which can be effectively used in cleaning openings of different sizes within predetermined limits, therefore making it necessary to have only one of these cleaners instead of a number of devices, such as electric drills, electrically operated brushes, and the like, which are now commonly employed for this purpose.

With my improved invention, merely by inserting the cleaner in the opening and running it up and down therein a few times, the carbon is easily removed from the walls forming the opening, and the opening is cleaned without the removal of any of the metal, so that it is in as good condition as when new. It will be understood that these openings are from ¼ to ⅝ of an inch in size so that it is extremely difficult to produce a tool which is effective for cleaning purposes due to the very small bore of the opening.

These and other objects of my invention will be more fully and better understood by reference to the accompanying sheet of drawings, in which—

Figure 1 is a side elevational view of the entire cleaner;

Figure 2 is a side view partially in elevation and partially in section of the head portion of the cleaner;

Figure 3 is a cross sectional view on lines 3—3 of Figure 1;

Figure 4 is an end view of the ferrule on lines 4—4 of Figure 2;

Figure 5 is an end view of the ferrule illustrated in Figure 4; taken from the opposite end on lines 5—5 of Figure 2;

Figure 6 is a view of a modified form of outer end construction;

Figure 7 is an elevational view of one of the blades;

Figure 8 is a cross sectional view showing the base of the blades when formed to fit around the stem;

Figure 9 is an elevational view of a modified form of ferrule;

Figure 10 is a sectional view of one end of the blades showing a modified form of blade;

Figure 11 is a view in elevation of a cleaner head of modified form of attaching the cleaner blades at the forward ends;

Figure 12 is an end view of the device shown in Figure 11;

Figure 13 is an elevational view showing the connecting link used at the forward ends of the blades;

Figure 14 is a view of a stem having flat faces formed thereon for use with the device of Figure 11; and Figure 15 is a view of one of the blades used in the modified form.

Referring now specifically to the drawings and in which like reference characters refer to like parts throughout, a cleaner having a stem portion 15 is shown, the stem portion being coiled upon itself to form a handle portion 16 and having a head or cleaner portion mounted at the opposite end thereof as hereinafter described.

This head or cleaner portion is barrel shaped and comprises a plurality of flat thin tempered blades 17, 17 extending in the form of a spiral throughout the length of the head portion and being anchored or fastened to the forward end of the stem 15 and slidably mounted upon the stem 15 at the rear ends thereof so that the head portion narrows transversely when pressure is applied to the flat spring members 17 and increases in length longitudinally, the rear ends of the blades sliding upon the stem 15.

The blades 17 (Fig. 7) have a front head portion 18 with wing portions 19 and 20 formed as a part of the head portion 18, and a rear end portion 21 which is diagonally disposed with respect to the body portion 17. The head portion 18 is placed in a former and bent to a semi-circular form (Fig. 8), the wing 20 also being bent to semi-circular form in a continuous line with the portion 18, while the wing 19 is bent outward and then turned at a position at right angles so that the offset end portions is formed, which overlaps the adjacent portion 20 of the blade when the blades are fitted around the stem 15.

Extending transversely across the head portion 18 is a groove 22 within which a ring 23 is adapted to seat and which serves to hold the ends 18 of the blades in proper position around the stem 15 when placed on the stem. An end cap 24 is provided which is inserted over the overlapped ends 18 of the blades 17, this cap having an opening 25 in the forward end thereof through which a stud 26 is fitted, this stud 26 being formed on the end of the stem 15 and extending through an opening formed in the cap member 24.

The head portion 18 is also slightly offset so that a shoulder 27 is formed on the blade with a cooperating annular shoulder 28 formed on the head 24 so that this shoulder abuts against the shoulder portion 27 formed on the blades in addition to engaging the blades at the sides. At the rear ends of the blades a ferrule 29 is provided, this ferrule having downturned portions 30, 30 formed thereon in spaced relation with each other adapted to engage against the stem 15 and acts as a spacer for the end 21 of the blades 17. The end 21 has an outturned portion 31 which engages against the rear edge of the ferrule 29. The ferrule 29 has rearwardly extending lip portions 32 formed thereon which act as spacers for the blades 17 and yet provide a free sliding movement for these blades on the stem 15.

In Figure 6 is illustrated a modified form of end construction in which the stem 15 has an annular ring portion 33 formed thereon with seats 34 being formed in the blades adapted to fit over this portion 33 on the stem 15. The blades at the outer ends thereof, in addition to having the overlapping side portions as shown in Figure 8, have their ends slightly outturned. A cap 35 is provided which fits over the ends of the blades, the cap having an inturned shoulder portion 36 adapted to engage tightly over the ends of the blades with the screw 37 being provided which is inserted into the end of the stem 15, thereby holding the ends of the blades in fixed relation with the end of the stem 15.

In Figures 9 and 10 is illustrated a modified form of ferrule construction and rear end construction for the blades. The ferrule as illustrated has a flat strip 38 having a head portion 39 at one end thereof and a cooperating recess 40 at the opposite end adapted to receive the head portion 39. A plurality of recesses 41 are provided in the body of the member 38 adapted to receive the wing portions 19 and 20 of the blade, which are outturned as illustrated in Figure 10, instead of being formed in circular form as illustrated in Figure 8 and designated as 19a. This member 38 is placed in a forming machine and formed to circular form and the head portion 39 inserted in the recess 40 and their edges welded together, if desired.

In Figure 11 a modified form of mounting the blades at their forward ends is shown, and in which a stem 45 is shown having an enlarged forward end 46 with a stud 47 being provided centrally positioned with respect to the stem 45. A plurality of flat inclined seats 48, 48 are provided within which links 49, 49 are adapted to seat. The outer ends 50 of the links 49 are downturned with their sides cut away (Fig. 12) and have recesses 51 therein into which the stud 47 extends. An end cap 52 is provided having an opening in the end thereof through which the studs 47 extends. The stud 47 is upset when the cap is placed over the end of the stem 45 thereby holding the cap 52 in position. The links 49 on their inner ends have hooked portions 53 formed thereon which engage similar hooked portions 54 in the blades 55, thereby forming a hinge at the forward ends of the blades.

This form of cutting head may be desirable because in use the greater portion of the work is performed by the forward ends of the blades 54. As the cleaner is forced into a passage, the head is contracted so that the blades must flex transversely at their forward ends. The blades must be highly tempered and continual flexing of the blades across a narrow area may result in metal fatigue, thereby allowing the blades to break. For this reason the links 49 are employed to which the blades 55 are connected by means of the hinge joint so that instead of the blades 55 flexing, they pivot about the hinge center. As shown, the links are mounted in the flat seats 48, 48, but may be formed so as to fit around the stem 15 shown in Figure 1, and the blades 17 secured to the links, as shown in Figures 11 and 13.

Blades 56 (Fig. 15) may also be used instead of the blades 55, with the stem 45, this blade 56 having two end portions 57 and 58 respectively, the end 57 having an upturned portion 59 which is engaged by the ferrule 29, so the blades are held in proper position about the stem 45 at their rear ends. The front end 58 is downturned at the line 59 during the assembling operation so as to abut the end of the stem 45, and has a recess 60 therein into which the stud 47 is fitted. The cap 52 is then fitted over the end of the stem 45 as hereinabove described. It will be understood that the blades are made of soft material and are tempered after the assembly operation while mounted on the stem, so that they may be shaped as desired.

In assembling the device the blades have their rear ends placed inside of the ferrule 29 and in the position as shown in Figure 2, whereupon the stem 15 is slipped through the ferrule 29 and holds the blades in position with respect to this ferrule after the assembly is made. The ferrule and the blades are slipped down over the stem 15 until the ends of the blades are even with the stem 15. These ends are thereupon grouped together in the manner illustrated in Figure 8 and the ring 23 placed over the ends of the blades if one is used and the cap 24 inserted over the ends of the blades and the screw 26 inserted so that the tool is completely assembled.

In assembling the device shown in Figures 11 to 14 inclusive, the rear ends of the blades are placed in the stem as heretofore described, and the links 49 are attached to the blades and laid into position in the seats 48, the cap 52 placed over the end of the stem, and the stud 47 upset to hold the cap in position. After the device is assembled the blades are tempered to the required hardness.

In operation the device is simply placed into an opening which it is desired to clean, and the head portion reciprocated in this opening so that any carbon or foreign material is removed by the sides of the edges scraping the material loose from the walls to which it has adhered, and the operation continued until the opening is thoroughly cleaned.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A valve guide cleaner comprising, in combination, a stem, a plurality of spirally arranged blades on said stem, a cap at the forward end overlapping the ends of the blades and the end of the stem, means whereby the said cap is secured to the said stem, and a freely movable ferrule at the rear end of said blades overlapping the ends thereof and having spacing means on said ferrule.

2. A valve guide cleaner comprising, in combination, a stem, a plurality of spirally arranged blades on said stem, a cap at the forward end overlapping the ends of the blades and the end of the stem, means whereby the said cap is secured to the said stem, and a slidably mounted ferrule at the rear end of said blades overlapping the ends thereof and having spacing means thereon, the said blades being inturned over the end of the stem.

3. A valve guide cleaner comprising, in combination, a stem, a plurality of blades forming a cleaning head having inturned ends overlapping the end of the stem, a cap fitted over the forward ends of the blades and against the inturned ends, fastening means for said cap to said stem, and a freely movable ferrule at the rear end of said blades having recesses therein into which upturned ends of the blades are fitted.

4. A valve guide cleaner comprising, in combination, a stem, a plurality of blades forming a cleaning head having inturned ends overlapping the end of the stem and having a stud formed on the end thereof, a cap fitted over the forward ends of the blades and against the inturned ends and having an opening therein through which the said stud extends, and a slidably mounted ferrule at the rear end of said blades having recesses therein into which upturned ends of the blades are fitted.

5. A scraping tool for small diameter openings, such as the guide openings for the valve stems of internal combustion engines, comprising a stem and a scraper head carried thereby, the over all diameter of the stem and the head where the latter is connected to the stem being slightly less than the diameter of the opening for which the tool is designed, thereby to give maximum strength and a working fit for the tool, the head comprising a plurality of scraper blades having their ends lying against the stem and their intermediate portions bulged outwardly from the stem, means for fixedly connecting corresponding ends of the blades to the stem, and means for confining the other corresponding ends of the blades to the stem while enabling slidable movements thereof on the stem.

Signed at Chicago, Illinois, this 5th day of December, 1929.

LEONARD W. JOHNSON.